(12) United States Patent
Chen et al.

(10) Patent No.: US 11,915,311 B2
(45) Date of Patent: Feb. 27, 2024

(54) USER SCORE MODEL TRAINING AND CALCULATION

(71) Applicant: TENCENT TECHNOLOGY (SHENZHEN) COMPANY LIMITED, Shenzhen (CN)

(72) Inventors: Peixuan Chen, Shenzhen (CN); Qian Chen, Shenzhen (CN); Lin Li, Shenzhen (CN); Sanping Wu, Shenzhen (CN); Weiliang Zhuang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 1422 days.

(21) Appl. No.: 15/954,378

(22) Filed: Apr. 16, 2018

(65) Prior Publication Data

US 2018/0232665 A1    Aug. 16, 2018

Related U.S. Application Data

(63) Continuation of application No. PCT/CN2017/075131, filed on Feb. 28, 2017.

(30) Foreign Application Priority Data

Mar. 15, 2016  (CN) .......................... 201610145843.X

(51) Int. Cl.
*G06Q 40/03* (2023.01)
*G06N 20/00* (2019.01)
(Continued)

(52) U.S. Cl.
CPC ............. *G06Q 40/03* (2023.01); *G06N 5/045* (2013.01); *G06N 20/00* (2019.01); *G06Q 40/02* (2013.01)

(58) Field of Classification Search
CPC ............ G06N 20/00; G06N 5/04; G06N 3/08; G06N 3/0454; G06N 7/005; G06N 3/0427;
(Continued)

(56) References Cited

U.S. PATENT DOCUMENTS

| 2002/0138333 A1 | 9/2002 | DeCotiis et al. |
| 2013/0198810 A1* | 8/2013 | Lunt ...................... H04L 51/32 726/4 |

(Continued)

FOREIGN PATENT DOCUMENTS

| CN | 103514566 | 1/2014 |
| CN | 104463603 | 3/2015 |

(Continued)

OTHER PUBLICATIONS

Lin et al., Machine Learning in Financial Crisis Prediction: A Survey, 2011 (Year: 2011).*

(Continued)

*Primary Examiner* — Ann J Lo
*Assistant Examiner* — Charles C Kuo
(74) *Attorney, Agent, or Firm* — ARENTFOX SCHIFF LLP

(57) ABSTRACT

A method, apparatus, and server for generating a user score based on social networking information is provided. In the disclosed method, by processing circuitry of an information processing apparatus, default annotation information of a plurality of sampled users, an $i^{th}$ user score and an $i^{th}$ relative user score for each of the sampled users are obtained. A user score model is trained according to the $i^{th}$ user score of the respective sampled user, the $i^{th}$ relative user score of the respective sampled user, and the default annotation information of the respective sampled user. An $(i+1)^{th}$ user score of the respective sampled user is subsequently calculated and a trained user score model, for each of the sampled (Continued)

users, is obtained when the $(i+1)^{th}$ user score for the respective sampled user satisfies a training termination condition, The method provides a solution to evaluate the user score for a use when personal information of the user is missing or incorrect.

36 Claims, 7 Drawing Sheets

(51) Int. Cl.
  *G06Q 40/02* (2023.01)
  *G06N 5/045* (2023.01)
(58) Field of Classification Search
  CPC ........ G06N 5/003; G06N 5/046; G06N 20/20; G06N 3/04; G06N 20/10; G06N 3/105; G06N 5/02; G06N 5/022; G06N 5/025
  See application file for complete search history.

(56) References Cited

U.S. PATENT DOCUMENTS

| | | | |
|---|---|---|---|
| 2013/0317966 A1* | 11/2013 | Bass | G06F 3/04847 705/37 |
| 2014/0052604 A9* | 2/2014 | Stewart | G06Q 50/01 705/38 |
| 2015/0019405 A1 | 1/2015 | Merrill et al. | |
| 2016/0267587 A1* | 9/2016 | Woltsovitch | G06Q 50/01 |
| 2017/0053336 A1* | 2/2017 | Barbour | G06F 16/9535 |

FOREIGN PATENT DOCUMENTS

| | | |
|---|---|---|
| CN | 104574110 | 4/2015 |
| JP | 2002-109208 | 4/2002 |
| JP | 2002-123649 | 4/2002 |
| JP | 2014-71532 A | 4/2014 |
| KR | 10-2009-0087485 | 8/2009 |
| KR | 10-2013-0065778 | 6/2013 |

OTHER PUBLICATIONS

Zhang et al., Research on Credit Scoring by Fusing Social Media Information in Online Peer-to-Peer Lending, 2016, Procedia Computer Science 91 (2016), pp. 168-174 (Year: 2016).*
International Preliminary Report on Patentability dated Sep. 18, 2018 in International Application No. PCT/CN2017/075131.
Written Opinion of the International Searching Authority dated May 31, 2017 in International Application No. PCT/CN2017/075131 (with English translation).
Office Action dated Jan. 25, 2019 in Korean Patent Application No. 10-2018-7007645.
International Search Report dated May 31, 2017 in PCT/CN2017/075131 filed Feb. 28, 2017. (With English Translation).
Office Action dated Nov. 5, 2018 in Japanese Patent Application No. 2018-535228 (with unedited computer generated English translation).

* cited by examiner

USER SCORE MODEL TRAINING AND CALCULATION

RELATED APPLICATION

This application is a continuation of International Application No. PCT/CN2017/075131, filed on Feb. 28, 2017, which claims priority to Chinese Patent Application No. 201610145843.X, filed with the Chinese Patent Office on Mar. 15, 2016. The entire disclosures of the prior applications are hereby incorporated by reference in their entirety.

FIELD OF THE TECHNOLOGY

Embodiments of the present disclosure relate to the field of user score assessment.

BACKGROUND OF THE DISCLOSURE

A credit score is a user score obtained by a credit assessment institution by performing a quantitative analysis on personal credit information by using a credit score model. The credit score is used to represent personal credit of a user.

In the related technology, a credit score calculation model is mainly a Fair Isaac Company (FICO) credit score model. In the FICO credit score model, first, personal credit, morality, and a payment capability of a user are used as indicators; a score of each indicator is obtained according to a level of each indicator; different levels correspond to different scores; and a credit score of the user is calculated according to a weight and the score of each indicator.

During implementation of embodiments of the present disclosure, the inventors found that the related technology has at least the following problem:

Data used in the FICO credit score model is specific to personal information of the user. Consequently, when the personal information of the user is missing or incorrect, it is very difficult to accurately calculate the credit score of the user.

SUMMARY

To resolve a problem that when personal information of a user is missing or incorrect, it is very difficult to accurately calculate a credit score of the user, embodiments of the present disclosure provide a credit score model training method, and a credit score calculation method, apparatus, and server. The technical solutions are as follows:

In an embodiment of the present disclosure, a method for generating a user score based on social networking information is provided. By processing circuitry of an information processing apparatus, an $i^{th}$ user score, an $i^{th}$ relative user score, and default annotation information of a plurality of sampled users are obtained where i is a positive integer with an initial value of 1. For each of the sampled users, a user score model is trained according to the $i^{th}$ user score of the respective sampled user, the $i^{th}$ relative user score of the respective sampled user, and the default annotation information of the respective sampled user, and an $(i+1)^{th}$ user score of the respective sampled user is calculated. A trained user score model is obtained, for each of the sampled users, when the $(i+1)^{th}$ user score of the respective sampled user satisfies a training termination condition. In the disclosed method, the $i^{th}$ relative score of one of the sampled users is calculated according to an $i^{th}$ user score of each of one or more other users that has a social relation with the one of the sampled users and the default annotation information of the one of the sampled users is used to classify the one of the sampled users.

The method further includes, after the user score model is obtained, obtaining a first user score of a user and a first relative user score of the user, where the user is not necessarily a sampled user. The first relative user score of the user is calculated according to a first user score of each of one or more other users that has a social relation with the user. The method includes inputting the first user score of the user and the first relative user score of the user to the trained credit score model, to calculate a target credit score of the user.

In another embodiment of the present disclosure, an information processing apparatus is provided. The apparatus includes processing circuitry to obtain an $i^{th}$ user score of a plurality of sampled users, an $i^{th}$ relative user score of each of the sampled users, and default annotation information of each of the sampled users, i is a positive integer with an initial value of 1. The processing circuitry, for each of the sampled users, trains a user score model according to the $i^{th}$ user score of the respective sampled user, the $i^{th}$ relative user score of the respective sampled user, and the default annotation information of the respective sampled user, and calculates an $(i+1)^{th}$ user score of the respective sampled user. The processing circuitry obtains the trained user score model, for each of the sampled users, when the $(i+1)^{th}$ user score of the respective sampled user satisfies a training termination condition. The $i^{th}$ relative score of one of the sampled users is calculated according to an $i^{th}$ user score of each of one or more other users that has a social relation with the one of sampled users and the default annotation information of the one of the sampled users is used to classify the one of the sampled users.

The processing circuitry further obtains, once the user score model is obtained, a first credit score of a user and a first relative score of the user, where the user is not necessarily the sampled user. The first relative user score of the user is calculated according to a first user score of each of one or more other users that has a social relation with the user. Subsequently, for each user, the processing circuitry inputs the first user score of the user and the first relative user score of the user to the trained user score model to calculate a target credit score of the user.

In another embodiment of the present disclosure, a server is provided. The server includes processing circuitry configured to obtain $i^{th}$ user scores of a plurality of sampled users, an $i^{th}$ relative user score of each of the sampled users, and default annotation information of each of the sampled users, where i is a positive integer with an initial value of 1. For each of the sampled users, a user score model is trained according to the $i^{th}$ user score of the respective sampled user, the $i^{th}$ relative user score of the respective sampled user, and the default annotation information of the respective sampled user. An $(i+1)^{th}$ user score of the respective sampled user is calculated subsequently and a trained user score model is obtained, for each of the sampled users, when the $(i+1)^{th}$ user score of the respective sampled user satisfies a training termination condition. The $i^{th}$ relative user score of one of the sampled users is calculated according to an $i^{th}$ user score of each of one or more other users that has a social relation with the one of the sampled users and the default annotation information of the one of the sampled users is used to classify the one of the sampled users.

Once the user score model is obtained, the server further obtains a first credit score of a user and a first relative score of the user, where the user is not necessarily the sampled user. The first relative user score of the user is calculated according to a first user score of each of one or more other users that has a social relation with the user. For each user, the first user score of the user and the first relative score of the user is input to the trained user score model to calculate a target credit score of the user.

The technical solutions provided in the embodiments of the present disclosure have the following beneficial effects: $i^{th}$ user scores of a plurality of sampled users, an $i^{th}$ relative user score of each of the sampled users, and default annotation information of each of the sampled users are obtained For each of the sampled users, a c user score model is trained according to the $i^{th}$ user score of the respective sampled user, the $i^{th}$ relative user score of the respective sampled user, and the default annotation information of the respective sampled user, and an $(i+1)^{th}$ user score of the respective sampled user is calculated. The trained user score model is obtained when the $(i+1)^{th}$ user score of each of the sampled users satisfies a training termination condition. So that a problem that when personal information of a user is missing or incorrect, it is very difficult to accurately calculate a user score of the user is resolved. In the present disclosure, statistics on a personal user score of the user and a user score of another user that has a social relation with the user are collected at the same time to comprehensively calculate a target credit score of the user, thereby achieving effects of expanding coverage of the user score model, and improving accuracy of calculating the credit score of the user.

BRIEF DESCRIPTION OF THE DRAWINGS

To describe the technical solutions of the embodiments of the present disclosure more clearly, the following briefly introduces the accompanying drawings required for describing the embodiments. The accompanying drawings in the following description show merely some embodiments of the present disclosure, and a person of ordinary skill in the technology may still derive other drawings from these accompanying drawings.

DESCRIPTION OF EMBODIMENTS

To make the objectives, technical solutions, and advantages of the present disclosure clearer, the following further describes implementations of the present disclosure in detail with reference to the accompanying drawings.

A credit score is a user score obtained by performing modeling on personal credit information by using a mathematical model. The score may be used for performing risk assessment on a credit service in the financial field. Personal credit information includes credit related information items of a user.

In a credit score model disclosed in embodiments of the present disclosure, mainly, a target credit score of a user is comprehensively calculated by using a credit score of the user and a relational credit score that is calculated based on a social relation of the user, thereby achieving an effect that the target credit score of the user can still be calculated by using the relational credit score calculated based on the social relation of the user when personal information of user is missing or incorrect. The embodiments of the present disclosure include an embodiment of a credit score model training method and an embodiment of calculating a credit score of a user based on the credit score model. For the credit score model training method, refer to embodiments shown in FIG. 1 and FIG. 2A; and for a credit score calculation method, refer to embodiments shown in FIG. 3 and FIG. 4A.

Figure 1:
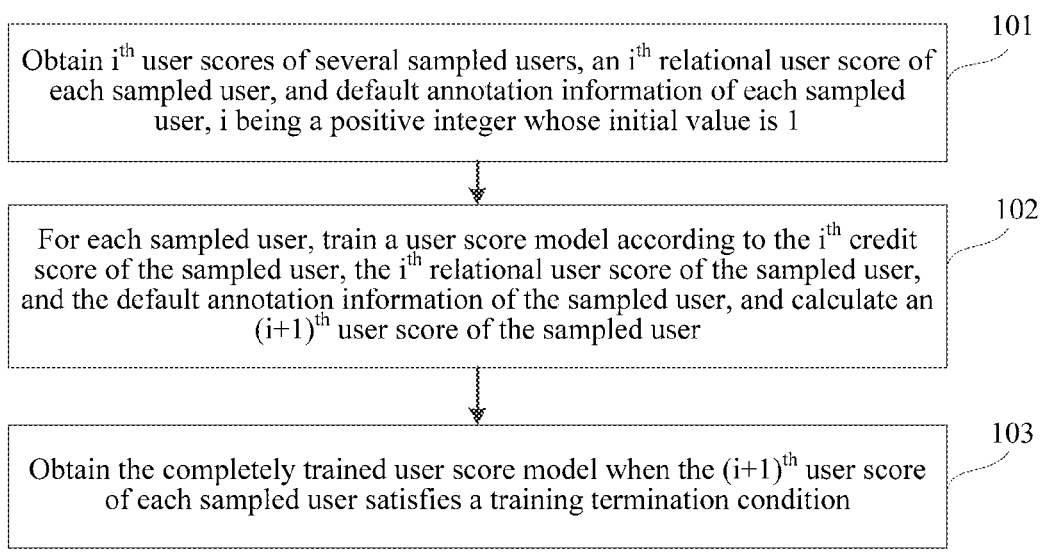
FIG. 1 is a flowchart of a user score model training method according to an exemplary embodiment of the present disclosure.

Referring to FIG. 1, FIG. 1 is a flowchart of a credit score (or user score) model training method according to an exemplary embodiment of the present disclosure. The method includes the following steps:

Step 101: Obtain $i^{th}$ credit scores of several sampled users, an $i^{th}$ relational credit score of each sampled user, and default annotation information of each sampled user, i being a positive integer whose initial value is 1.

Before a credit score model is trained, a sample set for training the credit score model is obtained first.

The sample set includes first credit scores of the several sampled users, a first relational (or relative) credit score corresponding to each sampled user, and the default annotation information of each sampled user.

A relational credit score of the sampled user is calculated according to a credit score of each other user that has a social relation with the sampled user. Optionally, each other user that has a social relation with the sampled user may be a sampled user in the sample set, or may be a user that is not in the sample set.

The default annotation information of the sampled user is used to indicate a default status of the sampled user.

Step 102: For each sampled user, train a credit score model according to the $i^{th}$ credit score of the sampled user, the $i^{th}$ relational credit score of the sampled user, and the default annotation information of the sampled user, and calculate an $(i+1)^{th}$ credit score of the sampled user.

Optionally, the step of calculating an $(i+1)^{th}$ credit score of the sampled user may include: for each sampled user, inputting the $i^{th}$ credit score of the sampled user and the $i^{th}$ relational (or relative) credit score of the sampled user to a preset credit score model when i≥2, to calculate the $(i+1)^{th}$ credit score of the sampled user.

Step 103: Obtain the completely trained credit score model when the $(i+1)^{th}$ credit score of each sampled user satisfies a training termination condition, To sum up, according to the credit score model training method provided in this embodiment, $i^{th}$ credit scores of several sampled users, an $i^{th}$ relational credit score of each sampled user, and default annotation information of each sampled user are obtained; a credit score model is trained according to the $i^{th}$ credit score of the sampled user, the $i^{th}$ relational credit score of the sampled user, and the default annotation information of the sampled user, and an $(i+1)^{th}$ credit score of the sampled user is calculated; and the completely trained credit score model is obtained when the $(i+1)^{th}$ credit score of each sampled user satisfies a training termination condition, so that a problem that when personal information of a user is missing or incorrect, it is very difficult to accurately calculate a credit score of the user is resolved; and statistics on a personal credit score of the user and a credit score of another user that has a social relation with the user are collected at the same time to comprehensively calculate a target credit score of the user, thereby achieving effects of expanding coverage of the credit score model, and improving accuracy of calculating the credit score of the user.

Figure 2A:
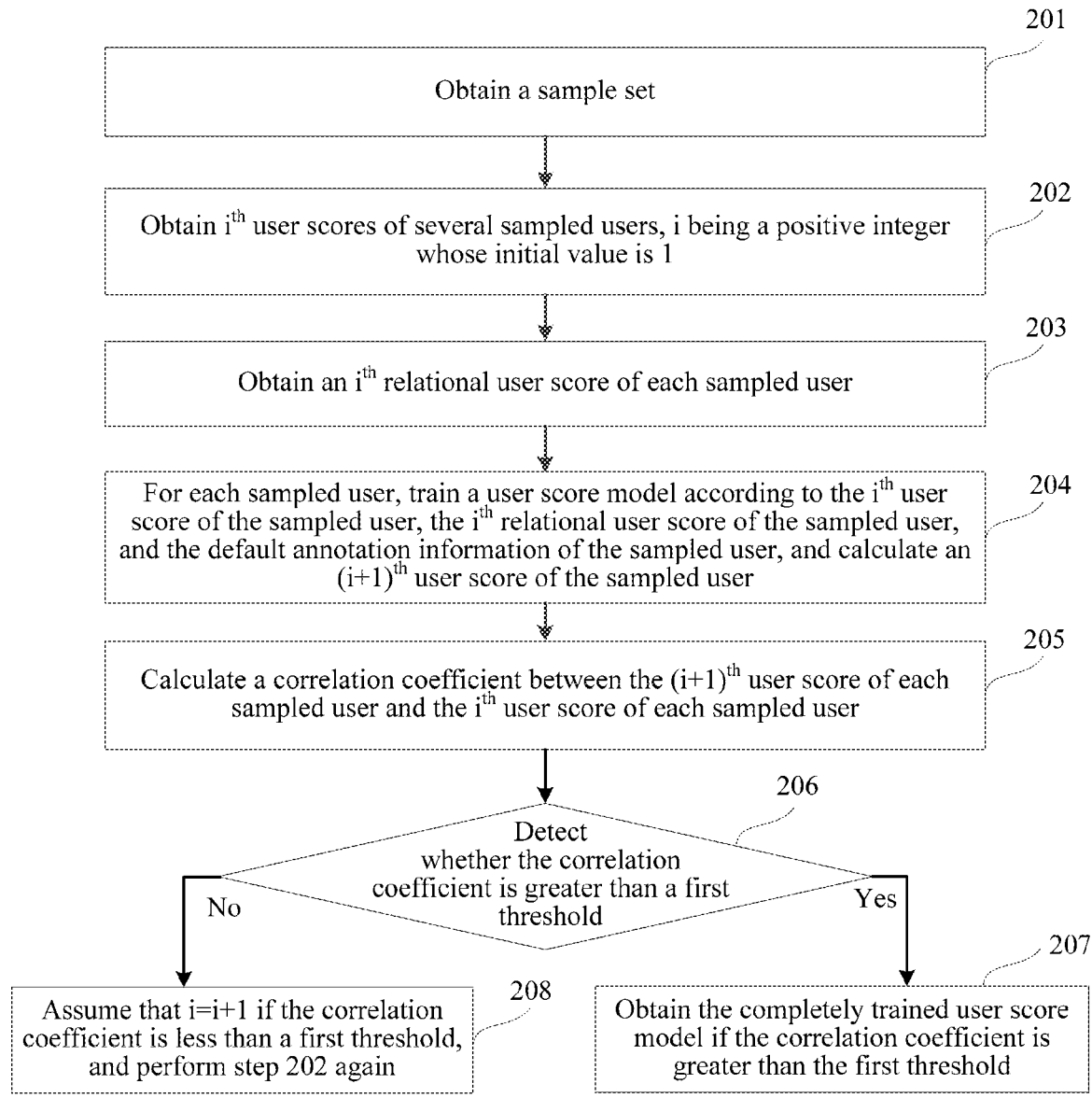
FIG. 2A is a flowchart of a user score model training method according to another exemplary embodiment of the present disclosure.

Referring to FIG. 2A, FIG. 2A is a flowchart of a credit score (or user score) model training method according to another exemplary embodiment of the present disclosure. The method includes the following steps:

Step 201: Obtain a sample set.

The sample set includes identifiers of several sampled users and default annotation information of each sampled user.

The identifiers of the sampled users are used to distinguish between the sampled users. For example, the sample set includes 100 sampled users, and identifiers of the sampled users are user1, user2, user3, . . . , and user100.

The default annotation information of the sampled user is used to indicate a default status of the sampled user. For example, the default annotation information of the sampled users included in the sample set is: user1(1), user2(0), user3(0), . . . , and user100(1), where 1 in the brackets indicates that the sampled user is in default, and is of a default type; and 0 in the brackets indicates that the sampled user is not in default, and is of a non-default type. Therefore, user1(1) indicates that the sampled user user1 is of a default type; user2(0) indicates that the sampled user user2 is of a non-default type; user3(0) indicates that the sampled user user3 is of a non-default type; and user100(1) indicates that the sampled user user100 is of a default type.

Optionally, in the default annotation information of the sampled user, a default status of the sampled user may be annotated according to a credit score of the sampled user, or may be annotated according to an actual default status of the sampled user. This is not limited in this embodiment.

For example, an example in which the default status of the sampled user is annotated according to the credit score of the sampled user is used for description. For example, a credit score of each sampled user is calculated by using a FICO credit score model in the related technology, and a default status of the sampled user is annotated according to the calculated credit score of the sampled user. Assuming that a score range of the FICO credit score model is 300 to 800, a sampled user whose credit score is greater than 550 is annotated as non-default, and a sampled user whose credit score is less than 550 is annotated as default. Using an example in which a credit score of the sampled user 1 is 580, a credit score of the sampled user 2 is 450, a credit score of the sampled user 3 is 480, a credit score of the sampled user 4 is 600, and a credit score of the sampled user 5 is 700, the sampled user 1 may be annotated as non-default, the sampled user 2 may be annotated as default, the sampled user 3 may be annotated as default, the sampled user 4 may be annotated as non-default, and the sampled user 5 may be annotated as non-default. Therefore, the sampled user 1, the sampled user 4, and the sampled user 5 together may be classified into one type, that is, the non-default type; and the sampled user 2 and the sampled user 3 may be classified into the other type, that is, the default type.

Step 202: Obtain $i^{th}$ credit scores of several sampled users, i being a positive integer whose initial value is 1.

When i=1, this step may include: calculating a first credit score of each sampled user according to personal information of each sampled user, for example, calculating the first credit score of the sampled user according to credit, morality, and a payment capability of the sampled user, for example, a calculation process in the FICO credit score model. Optionally, when there is a sampled user whose first credit score cannot be calculated according to personal credit information, a first relational (or relative) credit score of the sampled user is determined as the first credit score of the sampled user. The first relational credit score is calculated according to a first credit score of each other user that has a social relation with the sampled user.

When i≥2, an $i^{th}$ credit score of each sampled user calculated in step 208 is obtained.

Step 203: Obtain an $i^{th}$ relational credit score of each sampled user.

The first relational credit score of the sampled user is calculated according to a first credit score of each other user that has a social relation with the sampled user.

Optionally, each other user that has a social relation with the sampled user may be another sampled user in the sample set, or may be a user that is not in the sample set.

Optionally, for the sampled users, quantities of other users that have a social relation with the sampled users may be the same or may be different. For example, there are 50 other users that have a social relation with a sampled user A, and the 50 users are all sampled users in the sample set; there are 60 other users that have a social relation with a sampled user B, and 20 users are sampled users in the sample set, and 40 users are users that are not in the sample set; there are also 60 other users that have a social relation with a sampled user C, but 40 users are sampled users in the sample set, and 20 users are users that are not in the sample set. In this embodiment, a quantity of other users that have a social relation with each sampled user is not specifically limited.

Figure 2B:
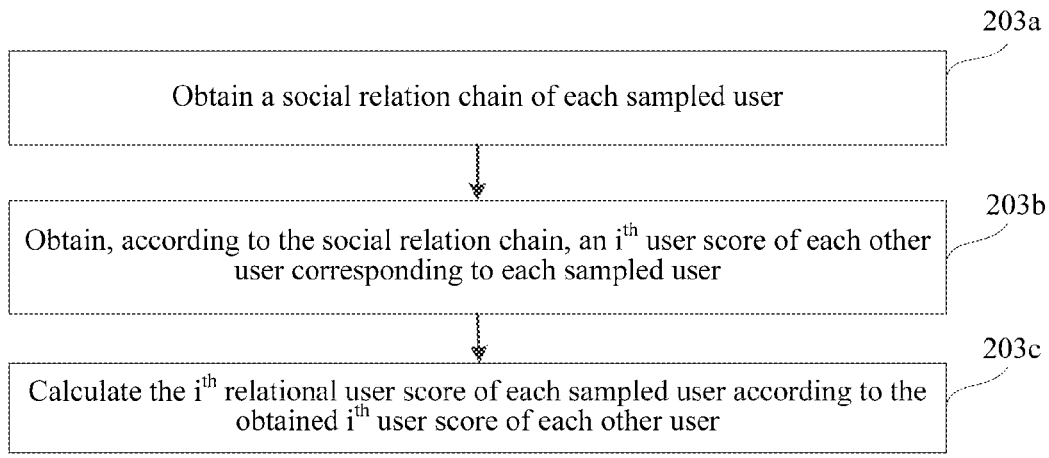
FIG. 2B is a flowchart of a relational user score calculation method according to an exemplary embodiment of the present disclosure.

Optionally, the $i^{th}$ relational credit score of each sampled user obtained in step 203 may be obtained by using the following steps, as shown in FIG. 2B.

Step 203a: Obtain a social relation chain of each sampled user.

The social relation chain is a social relation between the sampled user and another user. The social relation may include a social relation in the real world, for example, kinship, a colleague relation, or a classmate relation, or may be a friendship or a following relation in a social tool, for example, a WeChat friendship, a QQ friendship, a microblog friendship, a friendship in a same group, or a microblog following relation.

The social relation chain corresponding to each sampled user, that is, a social relation between each sampled user and another user, is obtained according to an identifier of the sampled user in the sample set.

Step 203*b*: Obtain, according to the social relation chain, an $i^{th}$ credit score of each other user corresponding to each sampled user.

For each sampled user, the $i^{th}$ credit score of each other user corresponding to the sampled user is obtained according to the social relation chain of the sampled user.

Step 203*c*: Calculate the $i^{th}$ relational credit score of each sampled user according to the obtained $i^{th}$ credit score of each other user.

Generally, a relational credit score of each sampled user may be calculated in the following two implementations:

In a possible implementation, this step includes: for each sampled user, calculating, according to the obtained $i^{th}$ credit score of each other user, an average value of the $i^{th}$ credit scores of the other users corresponding to the sampled user; and determining the calculated average value as the $i^{th}$ relational credit score of the sampled user.

For example, if a first credit score of the sampled user 1 is 350, and other users that have a social relation with the sampled user 1 include: another user 1, whose corresponding first credit score is 400; another user 2, whose corresponding first credit score is 400; another user 3, whose corresponding first credit score is 500; and another user 4, whose corresponding first credit score is 600, a first relational credit score of the sampled user 1 is 475, and a specific calculation formula is (400+400+500+600)/4=1900/4=475. By analogy, an $i^{th}$ relational credit score of the sampled user 1 may be calculated according to $i^{th}$ credit scores of the other users that have a social relation with the sampled user 1. Similarly, the $i^{th}$ relational credit score of each sampled user may be calculated.

In another possible implementation, the relational credit score of each sampled user may be calculated by using the $i^{th}$ credit score of each other user corresponding to the sampled user and a weight corresponding to each other user, which specifically includes the following steps:

A first substep: For each sampled user, obtain, according to the social relation chain, a weight corresponding to each other user. The weight corresponding to each other user is a ratio of the first credit score of each other user when a relational credit score of the sampled user is calculated. The weight corresponding to each other user may be determined according to a social relation type, for example, a weight corresponding to another user that has kinship with the sampled user is greater than a weight corresponding to another user that has a classmate relation with the sampled user. Alternatively, the weight corresponding to each other user may be determined according to intimacy, for example, a weight corresponding to another user that more frequently communicates with the sampled user is greater than a weight corresponding to another user that less frequently communicates with the sampled user. Alternatively, the weight corresponding to each other user may be determined according to duration of the social relation, for example, a weight corresponding to another user that has a long-term social relation with the sampled user is greater than a weight corresponding to another user that has a short-term social relation with the sampled user. In this embodiment, a manner of determining the weight corresponding to each other user that has a social relation with the sampled user is not specifically limited.

A second substep: Calculate the $i^{th}$ relational credit score of the sampled user according to the $i^{th}$ credit score of each other user and the weight corresponding to each other user. A specific calculation formula is as follows:

$$\text{score\_fri\_avg} = \sum_{j=1}^{n} \text{friend\_score\_j} * \text{op\_j} / \sum_{j=1}^{n} \text{op\_j},$$

where score_fri_avg is the $i^{th}$ relational credit score of the sampled user, friend_score_j is an $i^{th}$ credit score of a $j^{th}$ other user that has a social relation with the sampled user, and op_j is a weight corresponding to the $j^{th}$ other user that has a social relation with the sampled user.

For example, if the first credit score of the sampled user 1 is 350, and other users that have a social relation with the sampled user 1 include: the another user 1, whose corresponding first credit score is 400 and corresponding weight is 0.2; the another user 2, whose corresponding first credit score is 400 and corresponding weight is 0.4; the another user 3, whose corresponding first credit score is 500 and corresponding weight is 0.3; and the another user 4, whose corresponding first credit score is 600 and corresponding weight is 0.3, the first relational credit score of the sampled user 1 is 475, and a specific calculation formula is (400*0.2+400*0.4+500*0.3+600*0.3)/(0.2+0.4+0.3+0.3)=570/1.2=475. By analogy, the $i^{th}$ relational credit score of the sampled user 1 may be calculated according to the $i^{th}$ credit score of each other user that has a social relation with the sampled user 1 and the weight corresponding to each other user. Similarly, the $i^{th}$ relational credit score of each sampled user may be calculated.

Step 204: For each sampled user, train a credit score model according to the $i^{th}$ credit score of the sampled user, the $i^{th}$ relational credit score of the sampled user, and the default annotation information of the sampled user, and calculate an $(i+1)^{th}$ credit score of the sampled user.

When i=1, for each sampled user, the credit score model is trained according to the first credit score of the sampled user, the first relational credit score of the sampled user, and the default annotation information of the sampled user, and a second credit score of the sampled user is calculated.

When a first iteration is performed, the credit score model is trained according to the first credit score of each sampled user obtained in step 202 and the first relational credit score of each sampled user obtained in step 203 as characteristic variables, and the default annotation information of each sampled user as a target variable. The credit score model may be trained by using a method such as logistic regression, a neural network, or a decision tree. This is not limited in this embodiment. After the credit score model is trained, the second credit score of each sampled user may be calculated by using the credit score model.

When i≥2, for each sampled user, the credit score model is trained according to the $i^{th}$ credit score of the sampled user and the $i^{th}$ relational credit score of the sampled user, and the $(i+1)^{th}$ credit score of the sampled user is calculated.

Optionally, when an $i^{th}$ iteration is performed, the credit score model only needs to be trained according to the obtained $i^{th}$ credit score of each sampled user and the obtained $i^{th}$ relational credit score of each sampled user as characteristic variables, and the $(i+1)^{th}$ credit score of each sampled user is calculated by using an algorithm in the credit score model, without inputting the default annotation information of each sampled user again.

Optionally, a formula for calculating the $(i+1)^{th}$ credit score of the sampled user according to the $i^{th}$ credit score of the sampled user and the $i^{th}$ relational credit score of the sampled user is as follows:

new_score=f(score, score_fri_avg), where new_score is the $(i+1)^{th}$ credit score of the sampled user, score is the $i^{th}$ credit score of the sampled user, and score_fri_avg is the $i^{th}$ relational credit score of the sampled user. The f function is the trained credit score model.

Optionally, each sampled user may be classified according to the calculated $(i+1)^{th}$ credit score of the sampled user. The credit score and the default annotation information of each sampled user are connected by using the default annotation information of each sampled user and the calculated $(i+1)^{th}$ credit score of each sampled user, so that when the credit score model is used, the user is accurately classified.

Step 205: Calculate a correlation coefficient between the $(i+1)^{th}$ credit score of each sampled user and the $i^{th}$ credit score of each sampled user.

After the $(i+1)^{th}$ credit score of each sampled user is calculated in step 204, the correlation coefficient between the $(i+1)^{th}$ credit score of each sampled user and the $i^{th}$ credit score of each sampled user is calculated.

Optionally, a formula for calculating the correlation coefficient between the $(i+1)^{th}$ credit score of the sampled user and the $i^{th}$ credit score of the sampled user is as follows:

$$cor = correlation\_coefficient(score, new\_score),$$

where cor is the correlation coefficient between the $(i+1)^{th}$ credit score of each sampled user and the $i^{th}$ credit score of each sampled user, score is the $i^{th}$ credit score of each sampled user, and new_score is the $(i+1)^{th}$ credit score of each sampled user.

For example, if there are in total 100 sampled users participating in training of the credit score model, a set of $(i+1)^{th}$ credit scores of all the sampled users is X, and a set of $i^{th}$ credit scores of all the sampled users is Y, a correlation coefficient between an $(i+1)^{th}$ credit score of each sampled user and an $i^{th}$ credit score of each sampled user is a correlation coefficient between the set X and the set Y that is calculated by using the correlation coefficient calculation formula.

Step 206: Detect whether the correlation coefficient is greater than a first threshold.

After the correlation coefficient between the $(i+1)^{th}$ credit score of each sampled user and the $i^{th}$ credit score of each sampled user is calculated, the correlation coefficient is compared with the first threshold, to detect a correlation between the $(i+1)^{th}$ credit score of each sampled user and the $i^{th}$ credit score of each sampled user.

Step 207: Obtain the completely trained credit score model if the correlation coefficient is greater than the first threshold.

If the correlation coefficient between the $(i+1)^{th}$ credit score of each sampled user and the $i^{th}$ credit score of each sampled user is greater than the first threshold, it indicates that the $i^{th}$ credit score and the $(i+1)^{th}$ credit score of each sampled user tend to be the same, the model training process ends, the current credit score model is the completely trained credit score model, and the $(i+1)^{th}$ credit score of each sampled user is the target credit score calculated by using the credit score model.

Step 208: Assume that i=i+1 if the correlation coefficient is less than a first threshold, and perform step 202 again.

Optionally, when the correlation coefficient is less than the first threshold, the $(i+1)^{th}$ credit score of each sampled user is input, and an $(i+1)^{th}$ credit score of each other user corresponding to each sampled user is re-obtained according to the social relation chain. However, during the loop, for step 204, only the $(i+1)^{th}$ credit score of each sampled user and an $(i+1)^{th}$ relational credit score of each sampled user need to be input, and the default annotation information of each sampled user is not input.

Figure 2C:
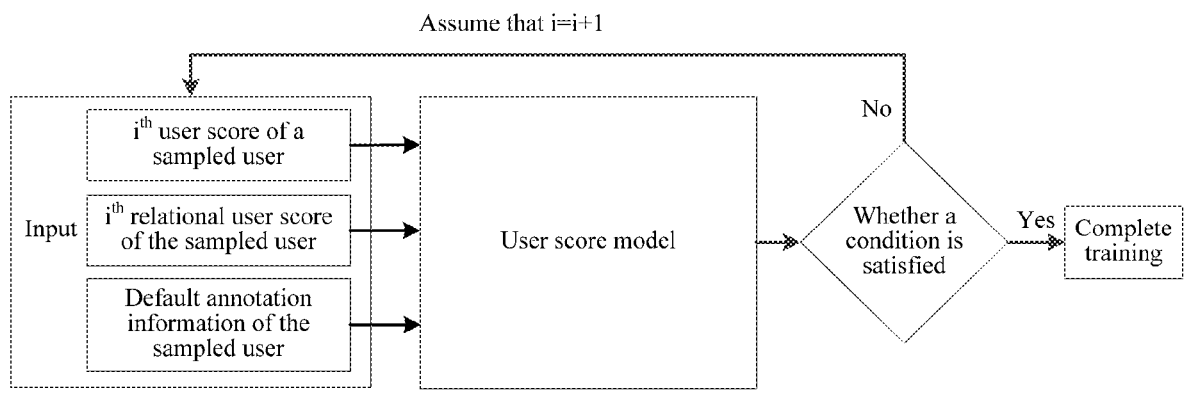
FIG. 2C is a schematic structural diagram of training of a user score model according to an exemplary embodiment of the present disclosure.

For ease of understanding by a reader, a schematic structural diagram of training of the credit score model shown in step 201 to step 208 in the embodiment in FIG. 2 is shown in FIG. 2C.

To sum up, according to the credit score model training method provided in this embodiment, $i^{th}$ credit scores of several sampled users, an $i^{th}$ relational credit score of each sampled user, and default annotation information of each sampled user are obtained; a credit score model is trained according to the $i^{th}$ credit score of the sampled user, the $i^{th}$ relational credit score of the sampled user, and the default annotation information of the sampled user, and an $(i+1)^{th}$ credit score of the sampled user is calculated; and the completely trained credit score model is obtained when the $(i+1)^{th}$ credit score of each sampled user satisfies a training termination condition, so that a problem that when personal information of a user is missing or incorrect, it is very difficult to accurately calculate a credit score of the user is resolved; and statistics on a personal credit score of the user and a credit score of another user that has a social relation with the user are collected at the same time to comprehensively calculate a target credit score of the user, thereby achieving effects of expanding coverage of the credit score model, and improving accuracy of calculating the credit score of the user.

In addition, when there is a sampled user whose first credit score cannot be calculated according to personal credit information, a first relational credit score of the sampled user is determined as the first credit score of the sampled user, thereby achieving an effect that a credit score of a user can also be calculated according to a relational credit score of the user when a personal credit score of the user is missing.

It should be additionally noted that, step 203*b* of obtaining, according to the social relation chain, an $i^{th}$ credit score of each other user corresponding to each sampled user may be understood as that:

obtaining, according to the social relation chain, the first credit score of each of one or more other users related to each of the respective sampled user when i=1.

Optionally, the first credit score of each other user is a credit score of each other user calculated by using a credit score model based on personal information before the credit score model provided in this embodiment is trained. Certainly, if there is another credit score calculated by using an existing credit score model, the credit score may be used as the first credit score of another user. This is not limited in this embodiment.

The $i^{th}$ credit score of each other user corresponding to each sampled user is obtained according to the social relation chain when i≥2.

During training of the credit score model, because another user that has a social relation with the sampled user may be another sampled user in the sample set, during an $i^{th}$ iteration, an $i^{th}$ credit score of the another user may change, and when the $i^{th}$ iteration is performed, the $i^{th}$ credit score of each other user corresponding to each sampled user needs to be obtained according to the social relation chain. When another user that has a social relation with the sampled user is not another sampled user in the sample set, during an $i^{th}$ iteration, an $i^{th}$ credit score of the another user does not change. Therefore, when the $i^{th}$ iteration is performed, the $i^{th}$ credit score of each other user corresponding to the sampled user does not need to be obtained according to the social relation chain, and the first credit score of each other user obtained according to the social relation chain is directly used.

For example, during training of the credit score model, it is obtained that the another user 1 and the another user 2 that have a social relation with the sampled user A are both other sampled users in the sample set; and the first credit score of the another user 1 is 350, and the first credit score of the another user 2 is 400. Therefore, after the first iteration, a second credit score of the another user 1 is 380, and a second credit score of the another user 2 is 390. That is, because the another user 1 and the another user 2 are other sampled users in the sample set, during the first iteration, the second credit scores of the another user 1 and the another user 2 change. When a second iteration is performed, a second credit score of each other user corresponding to the sampled user A needs to be obtained according to the social relation chain. By analogy, when the $i^{th}$ iteration is performed, an $i^{th}$ credit score of each other user corresponding to the sampled user A needs to be obtained according to the social relation chain.

In a specific example, it is assumed that 100 borrowers serve as sampled users.

An identifier of each borrower, a first credit score corresponding to the identifier of each borrower, and default annotation information of each borrower are obtained first. For example, a borrower 1 whose corresponding credit score is 350 is annotated as default; a borrower 2 whose corresponding credit score is 400 is annotated as default; a borrower 3 whose corresponding credit score is 600 is annotated as non-default; a borrower 4 whose corresponding credit score is 650 is annotated as non-default; . . . ; and a borrower 100 whose corresponding credit score is 440 is annotated as default.

A credit score of each friend corresponding to the identifier of each borrower is obtained next. For example, friends corresponding to the borrower 1 include: a friend 1, whose corresponding credit score is 600, where a weight of the friend 1 is 0.4; a friend 2, whose corresponding credit score is 400, where a weight of the friend 2 is 0.4; a friend 3, whose corresponding credit score is 500, where a weight of the friend 3 is 0.2; and a friend 4, whose corresponding credit score is 700, where a weight of the friend 4 is 0.5. The friend 1 is a borrower 3 in the sampled users, and the friend 2 is a borrower 2 in the sampled users. Similarly, the credit score of each friend corresponding to each borrower and a weight corresponding to each friend may be obtained.

A first relational credit score corresponding to each borrower is calculated according to the credit score of each friend corresponding to each borrower. For example, a first relational credit score corresponding to the borrower 1 may be calculated by using the credit score of each friend corresponding to the borrower and the weight corresponding to each friend, and a specific calculation formula is: (600*0.4+400*0.4+500*0.2+700*0.5)/(0.4+0.4+0.2+0.5)=567. Therefore, the first relational credit score corresponding to the borrower 1 is 567. Similarly, the first relational credit score corresponding to each borrower may be calculated.

The first credit scores of the 100 borrowers, the first relational credit scores corresponding to the 100 borrowers, and the default annotation information corresponding to the 100 borrowers are input to a preset credit score model, and a second credit score corresponding to each borrower is calculated by using the credit score model according to an internal algorithm. For example, the first credit score, the first relational credit score, and the default annotation information of the borrower 1, the first credit score, the first relational credit score, and the default annotation information of the borrower 2, . . . , and the first credit score, the first relational credit score, and the default annotation information of the borrower 100 are input to the preset credit score model at the same time, and second credit scores corresponding to the borrower 1 to the borrower 100 are calculated by using the credit score model.

Correlation coefficients between the second credit scores corresponding to the 100 borrowers and the first credit scores corresponding to the 100 borrowers are calculated. For example, the correlation coefficients between the second credit scores corresponding to the borrower 1 to the borrower 100 and the first credit scores corresponding to the borrower 1 to the borrower 100 are calculated by using the formula shown in step 206.

When the correlation coefficient is greater than the first threshold, the completely trained credit score model is obtained. When the correlation coefficient is less than the first threshold, the calculated second credit scores corresponding to the borrower 1 to the borrower 100 and recalculated second relational credit scores corresponding to the borrower 1 to the borrower 100 continue to be input to the preset credit score model, to continue to calculate third credit scores corresponding to the borrower 1 to the borrower 100. The completely trained credit score model is obtained after a correlation coefficient between an $(i+1)^{th}$ credit score and an $i^{th}$ credit score that correspond to each borrower is greater than the first threshold.

Based on the embodiment shown in FIG. 2A, after the completely trained credit score model is obtained, the credit score of the user and the relational credit score of the user are input to the credit score model, to calculate the target credit score of the user. For specific steps, refer to an embodiment in FIG. 3.

Figure 3:
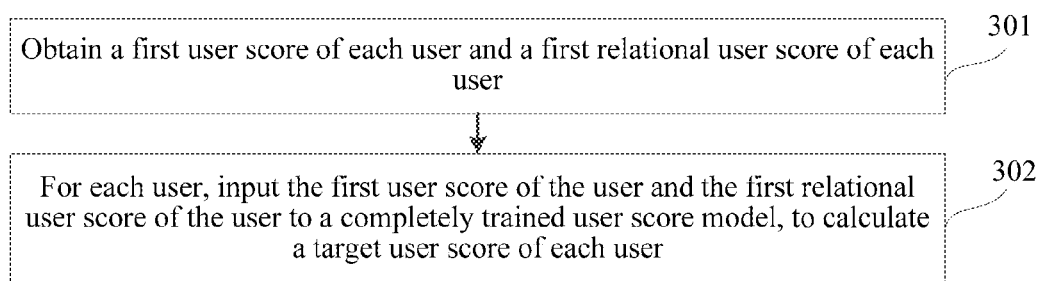
FIG. 3 is a flowchart of a user score calculation method according to an exemplary embodiment of the present disclosure.

Referring to FIG. 3, FIG. 3 is a flowchart of a credit score (or user score) calculation method according to an exemplary embodiment of the present disclosure. The method includes the following steps:

Step 301: Obtain a first credit score of each user and a first relational (or relative) credit score of each user.

The first relational credit score of the user is calculated according to a first credit score of each other user that has a social relation with the user. For a detailed process of calculating the first relational credit score of the user, refer to descriptions in step 203 in the embodiment in FIG. 2A.

When a target credit score of a user needs to be calculated by using a credit score model, a first credit score of each user and a first relational credit score of the each user whose target credit score needs to be calculated are obtained first.

Step 302: For each user, input the first credit score of the user and the first relational credit score of the user to a completely trained credit score model, to calculate a target credit score of the user.

To sum up, according to the credit score calculation method provided in this embodiment, a first credit score of each user and a first relational credit score of each user are obtained; and the first credit score and the first relational credit score of each user are input to a credit score model, to calculate a target credit score of the user, so that a problem that when personal information of a user is missing or incorrect, it is very difficult to accurately calculate a credit score of the user is resolved; and statistics on a personal credit score of the user and a credit score of another user that has a social relation with the user are collected at the same time to calculate a target credit score of the user, thereby achieving effects of expanding coverage of the credit score model, and improving accuracy of calculating the credit score of the user.

Figure 4A:
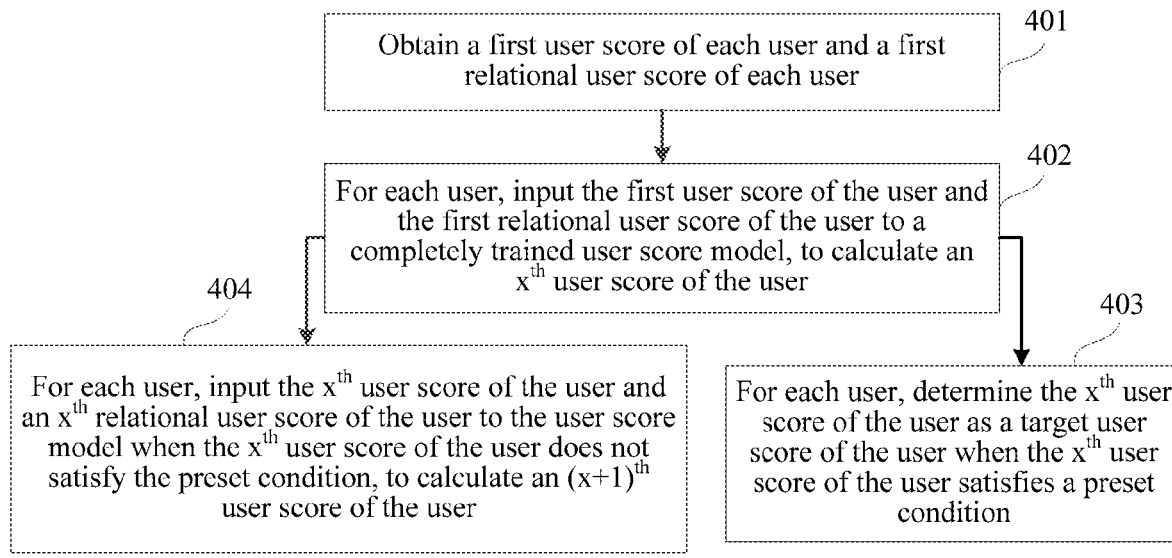
FIG. 4A is a flowchart of a user score calculation method according to another exemplary embodiment of the present disclosure.

Referring to FIG. 4A, FIG. 4A is a flowchart of a credit score calculation method according to another exemplary embodiment of the present disclosure. The method includes the following steps:

Step 401: Obtain a first credit score (user score) of each user and a first relational (or relative) credit score of each user.

The first relational credit score of the user is calculated according to a first credit score of each other user that has a social relation with the user. For a detailed process of calculating the first relational credit score of the user, refer to descriptions in step 203 in the embodiment in FIG. 2A.

When a target credit score of a user needs to be calculated by using a credit score model, a first credit score of each user and a first relational credit score of the each user whose target credit score needs to be calculated are obtained first.

In this embodiment, a quantity of users is not specifically limited.

Step 402: For each user, input the first credit score of the user and the first relational credit score of the user to a completely trained credit score model, to calculate an $x^{th}$ credit score of the user.

For each user, the first credit score of the user and the first relational credit score of the user are input to the completely trained credit score model. The first credit score and the first relational credit score of the user are analyzed and calculated by using an algorithm in the credit score model, to obtain the $x^{th}$ credit score of the user, where x is a positive integer.

Optionally, the first credit score of each user and the first relational credit score of each user are input to the completely trained credit score model, and the calculated $x^{th}$ credit score of each user is a credit score calculated after a same quantity of iterations in the credit score model are performed.

For example, in the credit score model training method shown in FIG. 2A, the completely trained credit score model is obtained after 100 iterations, and when the first credit score of each user and the first relational credit score of each user are input to the completely trained credit score model, the calculated $x^{th}$ credit score of each user is a credit score obtained after 100 iterative operations.

Step 403: For each user, determine the $x^{th}$ credit score of the user as a target credit score of the user when the $x^{th}$ credit score of the user satisfies a preset condition.

For each user, the calculated $x^{th}$ credit score of the user is directly determined as the target credit score of the user when the calculated $x^{th}$ credit score of the user satisfies the preset condition.

Figure 4B:
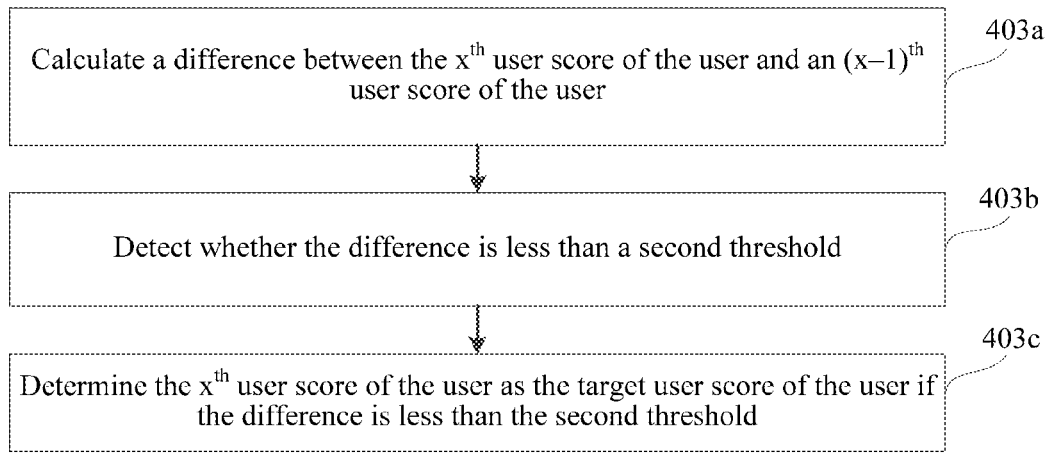
FIG. 4B is a flowchart of a loop computation termination condition according to an exemplary embodiment of the present disclosure.

Optionally, referring to FIG. 4B, a step of determining whether an $x^{th}$ credit score (or user score) of a user satisfies a preset condition may include the following substeps:

Step 403a: Calculate a difference between the $x^{th}$ credit score of the user and an $(x-1)^{th}$ credit score of the user.

After the $x^{th}$ credit score of the user is calculated by using the credit score model, the difference between the $x^{th}$ credit score and the $(x-1)^{th}$ credit score of the user is calculated.

Optionally, the difference between the $x^{th}$ credit score and the $(x-1)^{th}$ credit score of the user is calculated to detect a correlation between the $x^{th}$ credit score and the $(x-1)^{th}$ credit score of the user. Optionally, when there are a relatively small quantity of users, a correlation coefficient between an $x^{th}$ credit score of each user and an $(x-1)^{th}$ credit score of each user may be calculated, to determine a correlation between the $x^{th}$ credit score and the $(x-1)^{th}$ credit score.

In this embodiment, only an example in which the difference between the $x^{th}$ credit score and the $(x-1)^{th}$ credit score of the user is calculated is used for description. Optionally, the correlation coefficient between the $x^{th}$ credit score and the $(x-1)^{th}$ credit score of the user may be calculated for determining.

Step 403b: Detect whether the difference is less than a second threshold.

After the difference between the $x^{th}$ credit score and the $(x-1)^{th}$ credit score of each user is calculated, each difference is compared with the second threshold, to detect the correlation between the $x^{th}$ credit score of each user and the $(x-1)^{th}$ credit score of each user.

Step 403c: Determine the $x^{th}$ credit score of the user as the target credit score of the user if the difference is less than the second threshold.

If the difference between the $x^{th}$ credit score and the $(x-1)^{th}$ credit score of the user is less than the second threshold, it is determined that the $x^{th}$ credit score satisfies the preset condition. In this case, the $x^{th}$ credit score of the user is directly determined as the target credit score of the user.

If the difference between the $x^{th}$ credit score and the $(x-1)^{th}$ credit score of the user is not less than the second threshold, it is determined that the $x^{th}$ credit score does not satisfy the preset condition. It is assumed that x=x+1, and step 402 continues to be performed.

That is, if the difference is greater than the second threshold, the $x^{th}$ credit score of each user and an $x^{th}$ relational credit score of each user are input to the credit score model again, to continue to calculate an $(x+1)^{th}$ credit score of each user.

Step 404: For each user, input the $x^{th}$ credit score of the user and an $x^{th}$ relational credit score of the user to the credit score model again when the $x^{th}$ credit score of the user does not satisfy the preset condition, to calculate an $(x+1)^{th}$ credit score of the user.

When the $x^{th}$ credit score of the user does not satisfy the preset condition, the $x^{th}$ relational credit score of the user is re-obtained, and the $x^{th}$ credit score of the user and the $x^{th}$ relational credit score of the user are input to the credit score model again, to continue to calculate the $(x+1)^{th}$ credit score of the user. That is, it is assumed that x=x+1, and the step of calculating a difference between the $x^{th}$ credit score of the user and an $(x-1)^{th}$ credit score of the user is performed again.

To sum up, according to the credit score calculation method provided in this embodiment, a first credit score of each user and a first relational credit score of each user are obtained; and the first credit score and the first relational credit score of each user are input to a credit score model, to calculate a target credit score of the user, so that a problem that when personal information of a user is missing or incorrect, it is very difficult to accurately calculate a credit score of the user is resolved; and statistics on a personal credit score of the user and a credit score of another user that has a social relation with the user are collected at the same time to calculate a target credit score of the user, thereby achieving effects of expanding coverage of the credit score model, and improving accuracy of calculating the credit score of the user.

Figure 5:
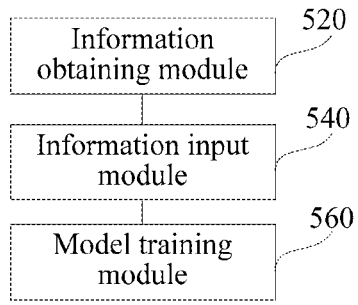
FIG. 5 is a structural block diagram of a user score model training apparatus according to an embodiment of the present disclosure.

Referring to FIG. 5, FIG. 5 is a structural block diagram of a credit score (or user score) model training apparatus according to an embodiment of the present disclosure. The credit score model training apparatus may be implemented by using software, hardware, or a combination of software and hardware. The credit score model training apparatus includes:

an information obtaining module 520, configured to: obtain default annotation information of several sampled users; and obtain an $i^{th}$ credit score of each sampled user and an $i^{th}$ relational (or relative) credit score of each sampled user;

an information input module 540, configured to: for each sampled user, train a credit score model according to the $i^{th}$ credit score of the sampled user, the $i^{th}$ relational credit score of the sampled user, and the default annotation information of the sampled user, and calculate an $(i+1)^{th}$ credit score of the sampled user; and a model training module 560, configured to obtain the completely trained credit score model when the $(i+1)^{th}$ credit score of each sampled user satisfies a training termination condition.

The $i^{th}$ relational credit score of the sampled user is calculated according to an $i^{th}$ credit score of each other user that has a social relation with the sampled user; and the default annotation information of the sampled user is used to classify the sampled user.

To sum up, the credit score model training apparatus provided in this embodiment obtains $i^{th}$ credit scores of several sampled users, an $i^{th}$ relational credit score of each sampled user, and default annotation information of each sampled user; trains a credit score model according to the $i^{th}$ credit score of the sampled user, the $i^{th}$ relational credit score of the sampled user, and the default annotation information of the sampled user, and calculates an $(i+1)^{th}$ credit score of the sampled user; and obtains the completely trained credit score model when the $(i+1)^{th}$ credit score of each sampled user satisfies a training termination condition, so that a problem that when personal information of a user is missing or incorrect, it is very difficult to accurately calculate a credit score of the user is resolved; and statistics on a personal credit score of the user and a credit score of another user that has a social relation with the user are collected at the same time to calculate a target credit score of the user, thereby achieving effects of expanding coverage of the credit score model, and improving accuracy of calculating the credit score of the user.

Figure 6:
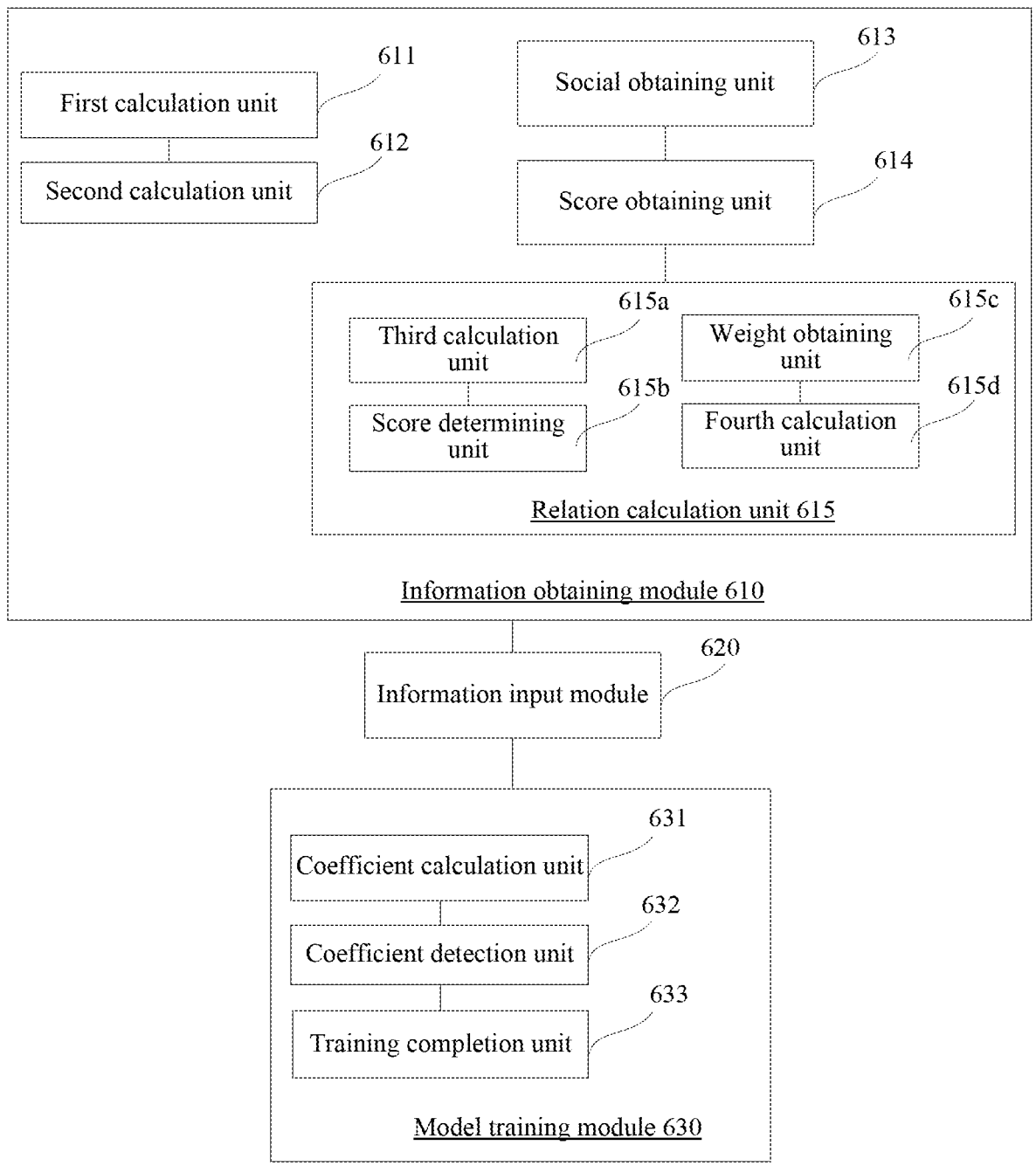
FIG. 6 is a structural block diagram of a user score model training apparatus according to another embodiment of the present disclosure.

Referring to FIG. 6, FIG. 6 is a structural block diagram of a credit score (or user score) model training apparatus according to another embodiment of the present disclosure. The credit score model training apparatus may be implemented by using software, hardware, or a combination of software and hardware. The credit score model training apparatus includes an information obtaining module 610, an information input module 620, and a model training module 630.

The information obtaining module 610 is configured to: obtain default annotation information of several sampled users; and obtain an $i^{th}$ credit score of each sampled user and an $i^{th}$ relational (or relative) credit score of each sampled user.

Optionally, when i=1, the information obtaining module 610 may include a first calculation unit 611 or a second calculation unit 612.

The first calculation unit 611 is configured to: for each sampled user, calculate a first credit score of the sampled user according to personal credit information of the sampled user.

The second calculation unit 612 is configured to determine, when there is a sampled user whose first credit score cannot be calculated according to personal credit information, a first relational credit score of the sampled user as the first credit score of the sampled user, where the first relational credit score is calculated according to a first credit score of each other user that has a social relation with the sampled user.

Optionally, the information obtaining module 610 may include a social obtaining unit 613, a score obtaining unit 614, and a relation calculation unit 615.

The social obtaining unit 613 is configured to obtain a social relation chain of each sampled user, where the social relation chain is a social relation between the sampled user and the other users.

The score obtaining unit 614 is configured to obtain, according to the social relation chain, an $i^{th}$ credit score of each other user corresponding to each sampled user.

The relation calculation unit 615 is configured to calculate the $i^{th}$ relational credit score of each sampled user according to the obtained $i^{th}$ credit score of each other user.

Optionally, the relation calculation unit 615 may include a third calculation unit 615a and a score determining unit 615b.

The third calculation unit 615a is configured to: for each sampled user, calculate an average value of the $i^{th}$ credit scores of the other users corresponding to the sampled user.

The score determining unit 615b is configured to determine the average value as the $i^{th}$ relational credit score of the sampled user.

Optionally, the relation calculation unit 615 may include a weight obtaining unit 615c and a fourth calculation unit 615d.

The weight obtaining unit 615c is configured to: for each sampled user, obtain, according to the social relation chain, a weight corresponding to each other user.

The fourth calculation unit 615d is configured to calculate the relational credit score of the sampled user according to the $i^{th}$ credit score of each other user and the weight corresponding to each other user, where a specific formula is as follows:

$$\text{score\_fri\_avg} = \sum_{j=1}^{n} \text{friend\_score\_j} * \text{op\_j} / \sum_{j=1}^{n} \text{op\_j}$$

where score_fri_avg is the $i^{th}$ relational credit score of the sampled user, friend_score_j is an $i^{th}$ credit score of a $j^{th}$ other user that has a social relation with the sampled user, and op_j is a weight corresponding to the $j^{th}$ other user that has a social relation with the sampled user.

The information input module 620 is configured to: for each sampled user, input the $i^{th}$ credit score of the sampled user, the $i^{th}$ relational credit score of the sampled user, and the default annotation information of the sampled user to a preset credit score model, to calculate an $(i+1)^{th}$ credit score of the sampled user.

The model training module 630 is configured to obtain the completely trained credit score model when the $(i+1)^{th}$ credit score of each sampled user satisfies a training termination condition.

The $i^{th}$ relational credit score of the sampled user is calculated according to an $i^{th}$ credit score of each other user that has a social relation with the sampled user; and the default annotation information of the sampled user is used to classify the sampled user.

Optionally, the model training module 630 may include a coefficient calculation unit 631, a coefficient detection unit 632, and a training completion unit 633.

The coefficient calculation unit 631 is configured to calculate a correlation coefficient between the $(i+1)^{th}$ credit score of each sampled user and the $i^{th}$ credit score of each sampled user.

The coefficient detection unit 632 is configured to detect whether the correlation coefficient is greater than a first threshold.

The training completion unit 633 is configured to obtain the completely trained credit score model if the correlation coefficient is greater than the first threshold.

Optionally, the credit score model includes a logistic regression classification model or a decision tree classification model.

To sum up, the credit score model training apparatus provided in this embodiment obtains $i^{th}$ credit scores of several sampled users, an $i^{th}$ relational credit score of each sampled user, and default annotation information of each sampled user; trains a credit score model according to the $i^{th}$ credit score of the sampled user, the $i^{th}$ relational credit score of the sampled user, and the default annotation information of the sampled user, and calculates an $(i+1)^{th}$ credit score of the sampled user; and obtains the completely trained credit score model when the $(i+1)^{th}$ credit score of each sampled user satisfies a training termination condition, so that a problem that when personal information of a user is missing or incorrect, it is very difficult to accurately calculate a credit score of the user is resolved; and statistics on a personal credit score of the user and a credit score of another user that has a social relation with the user are collected at the same time to calculate a target credit score of the user, thereby achieving effects of expanding coverage of the credit score model, and improving accuracy of calculating the credit score of the user.

In addition, when there is a sampled user whose first credit score cannot be calculated according to personal credit information, a first relational credit score of the sampled user is determined as the first credit score of the sampled user, thereby achieving an effect that a credit score of a user can also be calculated according to a relational credit score of the user when a personal credit score of the user is missing.

Figure 7:
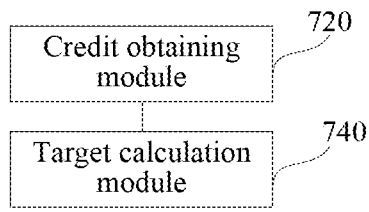
FIG. 7 is a structural block diagram of a user score calculation apparatus according to an embodiment of the present disclosure.

Referring to FIG. 7, FIG. 7 is a structural block diagram of a credit score (or user score) calculation apparatus according to an embodiment of the present disclosure. The credit score calculation apparatus may be implemented by using software, hardware, or a combination of software and hardware. The credit score calculation apparatus includes:

a credit obtaining module 720, configured to obtain a first credit score of each user and a first relational (or relative) credit score of each user, the first relational credit score of the user being calculated according to a first credit score of each other user that has a social relation with the user; and a target calculation module 740, configured to: for each user, input the first credit score of the user and the first relational credit score of the user to a completely trained credit score model, to calculate a target credit score of the user.

To sum up, the credit score calculation apparatus provided in this embodiment obtains a first credit score of each user and a first relational credit score of each user; and inputs the first credit score and the first relational credit score of each user to a credit score model, to calculate a target credit score of the user, so that a problem that when personal information of a user is missing or incorrect, it is very difficult to accurately calculate a credit score of the user is resolved; and statistics on a personal credit score of the user and a credit score of another user that has a social relation with the user are collected at the same time to calculate a target credit score of the user, thereby achieving effects of expanding coverage of the credit score model, and improving accuracy of calculating the credit score of the user.

Figure 8:
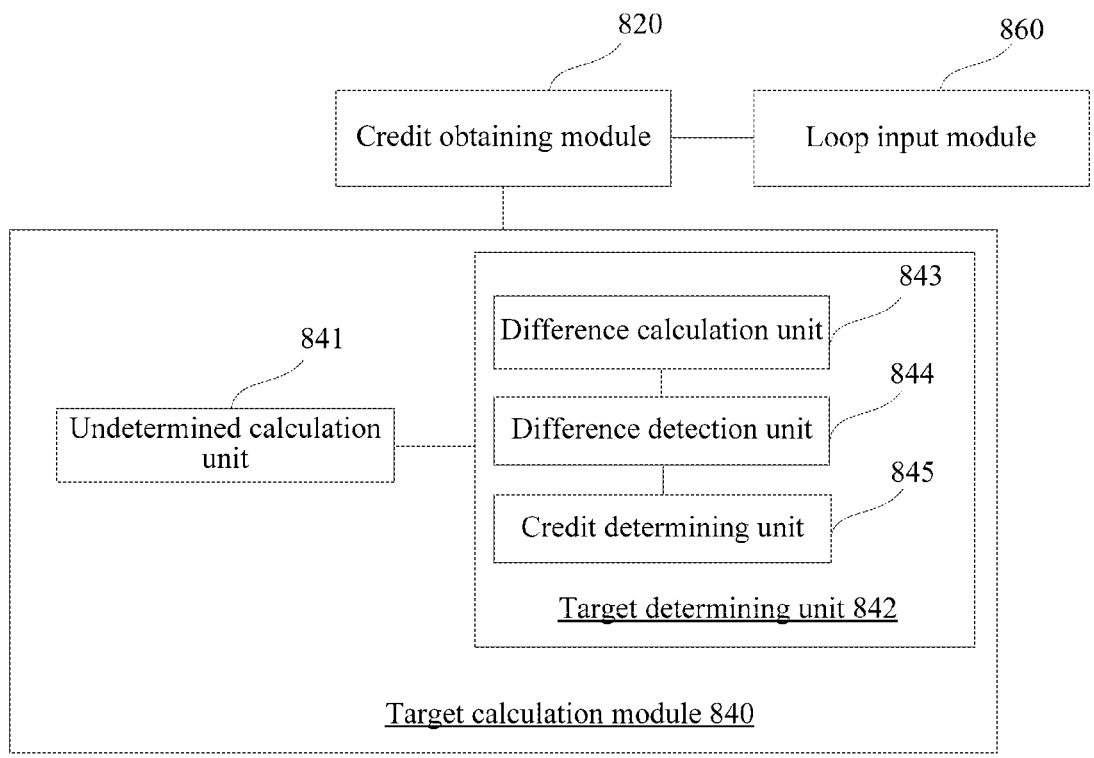
FIG. 8 is a structural block diagram of a user score calculation apparatus according to another embodiment of the present disclosure.

Referring to FIG. 8, FIG. 8 is a structural block diagram of a credit score (or user score) calculation apparatus according to another embodiment of the present disclosure. The credit score calculation apparatus may be implemented by using software, hardware, or a combination of software and hardware. The credit score calculation apparatus includes:

a credit obtaining module 820, configured to obtain a first credit score of each user and a first relational (or relative) credit score of each user, the first relational credit score of the user being calculated according to a first credit score of each other user that has a social relation with the user; and a target calculation module 840, configured to: for each user, input the first credit score of the user and the first relational credit score of the user to a completely trained credit score model, to calculate a target credit score of the user.

Optionally, the target calculation module 840 may include an undetermined calculation unit 841 and a target determining unit 842.

The undetermined calculation unit 841 is configured to input the first credit score of the user and the first relational credit score of the user to the completely trained credit score model, to calculate an $x^{th}$ credit score of the user.

The target determining unit 842 is configured to determine the $x^{th}$ credit score of the user as the target credit score of the user when the $x^{th}$ credit score of the user satisfies a preset condition.

Optionally, the target determining unit 842 may include a difference calculation unit 843, a difference detection unit 844, and a credit determining unit 845.

The difference calculation unit 843 is configured to calculate a difference between the $x^{th}$ credit score of the user and an $(x-1)^{th}$ credit score of the user.

The difference detection unit 844 is configured to detect whether the difference is less than a second threshold.

The credit determining unit 845 is configured to determine the $x^{th}$ credit score of the user as the target credit score of the user when the difference is less than the second threshold.

Optionally, the apparatus may further include a loop input module 860.

The loop input module 860 is configured to input the $x^{th}$ credit score of the user and an $x^{th}$ relational credit score of the user to the credit score model again when the $x^{th}$ credit score of the user does not satisfy the preset condition, to calculate an $(x+1)^{th}$ credit score of the user; and assume that x=x+1, and perform again the step of calculating a difference between the $x^{th}$ credit score of the user and an $(x-1)^{th}$ credit score of the user.

To sum up, the credit score calculation apparatus provided in this embodiment obtains a first credit score of each user and a first relational credit score of each user; and inputs the first credit score and the first relational credit score of each user to a credit score model, to calculate a target credit score of the user, so that a problem that when personal information of a user is missing or incorrect, it is very difficult to accurately calculate a credit score of the user is resolved; and statistics on a personal credit score of the user and a credit score of another user that has a social relation with the user are collected at the same time to calculate a target credit score of the user, thereby achieving effects of expanding coverage of the credit score model, and improving accuracy of calculating the credit score of the user.

Figure 9:
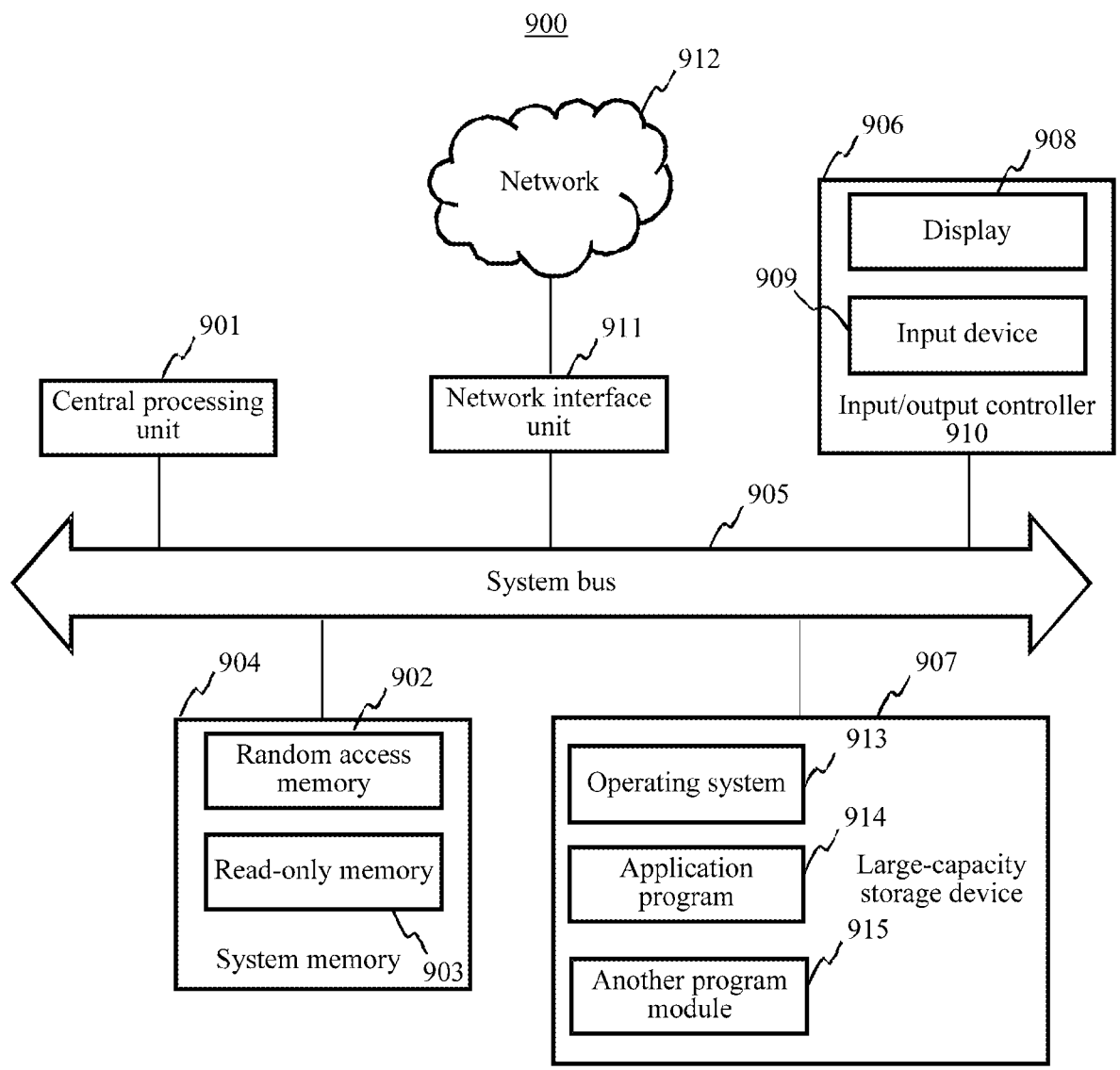
FIG. 9 is a structural block diagram of a server according to an embodiment of the present disclosure.

Refer to FIG. 9, FIG. 9 is a schematic structural diagram of a server according to an embodiment of the present disclosure. The server 900 includes a central processing unit (CPU) 901, a system memory 904 including a random access memory (RAM) 902 and a read-only memory (ROM) 903, and a system bus 904 connected to the system memory 901 and the CPU 905. The server 900 further includes a basic input/output system (I/O system) 906 assisting in transmitting information between devices in a computer, and a large-capacity storage device 907 configured to store an operating system 913, an application program 914 and another program module 915.

The basic I/O system 906 includes a display 908 configured to display information and an input device 909, such as a mouse or a keyboard, configured to input information by a user. The display 908 and the input device 907 are both connected to the CPU 901 by using an input/output controller 910 connected to the system bus 905. The basic I/O system 906 may further include the input/output controller 910 to be configured to receive and process inputs from multiple other devices such as a keyboard, a mouse, and an electronic stylus. Similarly, the input/output controller 910 further provides an output to a display screen, a printer or another type of output device.

The large-capacity storage device 907 is connected to the CPU 901 by using a large-capacity storage controller (not shown) connected to the system bus 905. The large-capacity storage device 907 and its associated computer-readable medium provide non-volatile storage for the server 900. That is, the large-capacity storage device 907 may include the computer-readable medium (not shown) such as a hard disk or a CD-ROM driver.

Without loss of generality, the computer-readable medium may include a computer storage medium and a communications medium. The computer storage medium includes volatile and non-volatile media, and removable and non-removable media implemented by using any method or technology used for storing information such as a computer-readable instruction, a data structure, a program module or other data. The computer storage medium includes a RAM, a ROM, an EPROM, an EEPROM, a flash memory or other solid-state storage technologies; a CD-ROM, a DVD or other optical storages; and a cassette, a magnetic tape, a disk storage or other magnetic storage devices. Certainly, a person skilled in art can know that the computer storage medium is not limited to the foregoing several types. The system memory 904 and the large-capacity storage device 907 may be collectively referred to as a memory.

According to various embodiments of the present disclosure, the server 900 may further be connected, by using a network such as the Internet, to a remote computer on the network and run. That is, the server 900 may be connected to a network 912 by using a network interface unit 911 connected to the system bus 905, and may also be connected to another type of network or remote computer system (not shown) by using the network interface unit 911.

The memory further includes one or more programs. The one or more programs are stored in the memory. The one or more programs are configured to perform the credit score model training method or the credit score calculation method provided in the foregoing embodiments.

In an exemplary embodiment, a non-transitory computer-readable storage medium including instructions, for example, a memory including instructions, is further provided. The instructions may be executed by a processor of a mobile terminal to perform the credit model training method or the credit score calculation method. For example, the non-transitory computer-readable storage medium may be a ROM, a RAM, a CD-ROM, a magnetic tape, a floppy disk, or an optical data storage device.

It should be noted that, when the credit score model training apparatus provided in the foregoing embodiment trains a credit score model, division of the foregoing functional modules is merely used as an example for description, and during actual application, the foregoing functions may be allocated to and accomplished by different functional modules as required, that is, the internal structure of the device is divided into different functional modules, so as to accomplish all or some of the functions described above. In addition, the credit score model training apparatus provided in the foregoing embodiment belongs to the same concept as the embodiment of the credit score model training method, and for the specific implementation process of the apparatus, refer to the method embodiment, and details are not described herein again.

It should be additionally noted that, when the credit score calculation apparatus provided in the foregoing embodiment performs calculation in a credit score model, division of the foregoing functional modules is merely used as an example for description, and during actual application, the foregoing functions may be allocated to and accomplished by different functional modules as required, that is, the internal structure of the device is divided into different functional modules, so as to accomplish all or some of the functions described above. In addition, the credit score calculation apparatus provided in the foregoing embodiment belongs to the same concept as the embodiment of the credit score calculation method, and for the specific implementation process of the apparatus, refer to the method embodiment, and details are not described herein again.

The sequence numbers of the foregoing embodiments of the present disclosure are merely for description but do not indicate the preference of the embodiments.

A person of ordinary skill in the art may understand that all or some of the steps of the foregoing embodiments may be implemented by using hardware, or may be implemented by a program instructing relevant hardware. The program may be stored in a computer-readable storage medium. The storage medium may be a ROM, a magnetic disk, an optical disc, or the like.

The foregoing descriptions are merely exemplary embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A method for generating a user score based on social networking information, the method comprising:
    obtaining, by processing circuitry of an information processing apparatus, default annotation information of a plurality of sampled users;
    obtaining an initial user score and an initial relative user score for each of the sampled users, the initial user score of the respective sampled user being determined as the initial relative user score of the respective sampled user when the initial user score of the respective sampled user cannot be calculated;
    training a user score model in an initial iteration of i iterations according to the initial user score, the initial relative user score, and the default annotation information for each of the sampled users, i being equal to 1 for the initial iteration, the user score model being configured to output a second user score for each of the sampled users based on the initial user score, the initial relative user score, and the default annotation information of the respective sampled user, the second user score being used to train the user score model in a second iteration, i being equal to 2 for the second iteration;

for each of the i iterations after the initial iteration, training the user score model according to $i^{th}$ user scores of the sampled users for the respective iteration and $i^{th}$ relative user scores of the sampled users in the respective iteration, the user score model being configured to output an $(i+1)^{th}$ user score for each of the sampled users based on the $i^{th}$ user score of the respective sampled user and the $i^{th}$ relative user score of the respective sampled user;

determining whether training of the user score model is completed based on whether the $(i+1)^{th}$ user scores of the sampled users satisfy a training termination condition; and obtaining a trained user score model when the $(i+1)^{th}$ user score of each of the sampled users satisfies the training termination condition, the $i^{th}$ relative user score of one of the sampled users being calculated according to an $i^{th}$ user score for each of one or more other users that has a social relation with the one of the sampled users; and the default annotation information of the one of the sampled users being used to classify the one of the sampled users.

2. The method according to claim 1, wherein when i=1, the obtaining the initial user score for each of the sampled users further comprising:

determining, when a first user credit score of the respective sampled user cannot be calculated according to personal information of the respective sampled user, a first relative user credit score of the respective sampled user as the first user credit score of the respective sampled user, the first relative user credit score being calculated according to a first user credit score for each of the one or more other users that has the social relation with the respective sampled user.

3. The method according to claim 1, wherein the obtaining the trained user score model comprises:

calculating a correlation coefficient between the $(i+1)^{th}$ user score for the respective sampled user and the $i^{th}$ user score for the respective sampled user;

detecting whether the correlation coefficient is greater than a first threshold; and obtaining the trained user score model for the respective sampled user based on a determination that the correlation coefficient is greater than the first threshold.

4. The method according to claim 1, further comprising:
for each of the i iterations,
obtaining a social relation chain for each of the sampled users, wherein the social relation chain is a social relation between the respective sampled user and the one or more other users that has the social relation with the respective sampled user;
obtaining, according to the social relation chain, the $i^{th}$ user score for each of the one or more other users related to each of the sampled users; and
calculating the $i^{th}$ relative user score for each of the sampled users according to the obtained $i^{th}$ user score for each of the one or more other users.

5. The method according to claim 4, wherein the calculating the $i^{th}$ relative user score for each of the sampled users comprises:

for each of the sampled users,
calculating an average value of the $i^{th}$ user scores of the one or more other users related to the respective sampled user; and
determining the average value as the $i^{th}$ relative user score of the respective sampled user.

6. The method according to claim 4, wherein the calculating the $i^{th}$ relative user score for each of the sampled users according to the obtained $i^{th}$ user score for each of the one or more other users comprises:

for each of the sampled users,
obtaining, according to the social relation chain, a corresponding weight related to each of the one or more other users; and
calculating the $i^{th}$ relative user score for the respective sampled user according to the $i^{th}$ user score for each of the one or more other users that has the social relation with the respective sampled user and the corresponding weight related to each of the one or more other users, the calculating being operated through a following specific formula:

$$\text{score\_fri\_avg} = \sum_{j=1}^{n} \text{friend\_score\_j} * \text{op\_j} / \sum_{j=1}^{n} \text{op\_j},$$

score_fri_avg being the $i^{th}$ relative score of one of the sampled users, and friend_score_j being an $i^{th}$ score for a $j^{th}$ user of the one or more other users that has the social relation with the one of the sampled users, and op_j being a corresponding weight related to the $j^{th}$ user of the one or more other users that has the social relation with the one of the sampled users.

7. The method according to claim 1, further comprising:
setting i=i+1, when the $(i+1)^{th}$ user score for each of the sampled users does not satisfy the training termination condition, performing another iteration of the training after the initial iteration to obtain a new $(i+1)^{th}$ user score for each of the sampled users.

8. The method according to claim 1, wherein training the user score model comprises a logistic regression classification model or a decision tree classification model.

9. The method according to claim 1, further comprising:
obtaining a first user score for a user and a first relative user score for the user, the first relative user score of the user being calculated according to a first user score for each of one or more other users that has a social relation with the user; and
inputting the first user score of the user and the first relative user score of the user to the trained user score model, to calculate a target user score of the user.

10. The method according to claim 9, wherein the inputting the first user score of the user and the first relative user score of the user comprises:
inputting the first user score of the user and the first relative user score of the user to the trained user score model, to calculate an $x^{th}$ user score of the user; and
determining the $x^{th}$ user score of the user as the target user score of the user when the $x^{th}$ user score of the user satisfies a preset condition.

11. The method according to claim 10, wherein the determining the $x^{th}$ user score of the user as the target user score of the user comprises:

calculating a difference between the $x^{th}$ user score of the user and an $(x-1)^{th}$ user score of the user;

detecting whether the difference is less than a second threshold; and determining the $x^{th}$ user score of the user as the target user score of the user based on a determination that the difference is less than the second threshold.

12. The method according to claim 10, further comprising:

inputting the $x^{th}$ user score of the user and an $x^{th}$ relative user score of the user to the trained user score model, when the $x^{th}$ user score of the user does not satisfy the preset condition, to calculate an $(x+1)^{th}$ user score of the user; and setting x=x+1, and performing the determining the $x^{th}$ user score of the user again to calculate a difference between the $x^{th}$ user score of the user and an $(x-1)^{th}$ user score of the user.

13. An information processing apparatus, the apparatus comprising:

processing circuitry configured to obtain default annotation information of a plurality of sampled users;

obtain an initial user score and an initial relative user score for each of the sampled users, the initial user score of the respective sampled user being determined as the initial relative user score of the respective sampled user when the initial user score of the respective sampled user cannot be calculated;

train a user score model in an initial iteration of i iterations according to the initial user score, the initial relative user score, and the default annotation information for each of the sampled users, i being equal to 1 for the initial iteration, the user score model being configured to output a second user score for each of the sampled users based on the initial user score, the initial relative user score, and the default annotation information of the respective sampled user, the second user score being used to train the user score model in a second iteration, i being equal to 2 for the second iteration;

for each of the i iterations after the initial training, train the user score model according to $i^{th}$ user scores of the sampled users for the respective iteration and $i^{th}$ relative user scores of the sampled users in the respective iteration, the user score model being configured to output an $(i+1)^{th}$ user score for each of the sampled users based on the $i^{th}$ user score of the respective sampled user and the $i^{th}$ relative user score of the respective sampled user;

determine whether training of the user score model is completed based on whether the $(i+1)^{th}$ user scores of the sampled users satisfy a training termination condition; and obtain a trained user score model when the $(i+1)^{th}$ score of each of the sampled users satisfies the training termination condition, the $i^{th}$ relative user score of one of the sampled users being calculated according to an $i^{th}$ user score of each of one or more other users that has a social relation with the one of the sampled users; and the default annotation information of the one of the sampled users being used to classify the one of the sampled users.

14. The apparatus according to claim 13, wherein, when i=1, the processing circuitry is configured to for each of the sampled users, determine, when a first user credit score of the respective sampled user cannot be calculated according to personal information of the respective sampled user, a first relative user credit score of the respective sampled user as the first user credit score of the respective sampled user, the first relative user credit score being calculated according to a first user credit score of each of the one or more other users that has the social relation with the respective sampled user.

15. The apparatus according to claim 13, wherein the processing circuitry is configured to calculate a correlation coefficient between the $(i+1)^{th}$ user score for each of the sampled users and the $i^{th}$ user score for each of the sampled users;

detect whether the correlation coefficient is greater than a first threshold; and obtain the trained user score model for the respective sampled user based on a determination that the correlation coefficient is greater than the first threshold.

16. The apparatus according to claim 13, wherein the processing circuitry is configured to obtain a social relation chain for each of the sampled users, the social relation chain being a social relation between the respective sampled user and the one or more other users;

obtain, according to the social relation chain, the $i^{th}$ score for each of the one or more other users related to each of the sampled users; and calculate the $i^{th}$ relative user score for each of the sampled users according to the obtained $i^{th}$ user score for each of the one or more other users that has the social relation with the respective sampled user.

17. The apparatus according to claim 16, wherein the processing circuitry is configured to for each of the sampled users, calculate an average value of the $i^{th}$ user score of the one or more other users related to the respective sampled user; and determine the average value as the $i^{th}$ relative user score of the respective sampled user.

18. The apparatus according to claim 16, wherein the processing circuitry is configured to for each of the sampled users, obtain, according to the social relation chain, a corresponding weight related to each of the one or more other users; and calculate the $i^{th}$ relative user score of the respective sampled user according to the $i^{th}$ score of each of the one or more other users that has the social relation with the respective sampled user and the corresponding weight related to each of the one or more other users, the calculation being operated through a following specific formula $$\text{score\_fri\_avg} = \sum_{j=1}^{n} \text{friend\_score\_j} * \text{op\_j} / \sum_{j=1}^{n} \text{op\_j},$$

score_fri_avg being the $i^{th}$ relative user score of one of the sampled users, friend_score_j being the $i^{th}$ user score for a $j^{th}$ user of the one or more other users that has the social relation with the one of the sampled users, and op_j being a corresponding weight related to the $j^{th}$ user of the one or more other users that has the social relation with the one of the sampled users.

19. The apparatus according to claim 13, wherein the processing circuitry is configured to set i=i+1, when the $(i+1)^{th}$ user score for each of the sampled users does not satisfy the training termination condition, and perform another iteration of the training after the initial iteration to obtain a new $(i+1)^{th}$ user score for each of the sampled users.

20. The apparatus according to claim 13, wherein the user score model comprises a logistic regression classification model or a decision tree classification model.

21. The apparatus according to claim 13, wherein the processing circuitry is configured to obtain a first user score of a user and a first relative user score of a user, the first relative user score of the user being calculated according to a first user score for each of one or more other users that has a social relation with the user; and input the first user score of the user and the first relative user score of the user to the trained user score model, to calculate an target user score of the user.

22. The apparatus according to claim 21, wherein the processing circuitry is configured to input the first user score of the user and the first relative user score of the user to the trained user score model, to calculate an $x^{th}$ user score of the user; and determine the $x^{th}$ user score of the user as the target user score of the user when the $x^{th}$ user score of the user satisfies a preset condition.

23. The apparatus according to claim 22, wherein the processing circuitry is configured to calculate a difference between the $x^{th}$ user score of the user and an $(x-1)^{th}$ user score of the user;

detect whether the difference is less than a second threshold; and determine the $x^{th}$ user score of the user as the target user score of the user when the difference is less than the second threshold.

24. The apparatus according to claim 22, wherein the processing circuitry is configured to input the $x^{th}$ user score of the user and an $x^{th}$ relative user score of the user to the user score model again when the $x^{th}$ user score of the user does not satisfy the preset condition, to calculate an $(x+1)^{th}$ user score of the user; and set x=x+1, and perform the determination again to calculate a difference between the $x^{th}$ user score of the user and a $(x-1)^{th}$ user score of the user.

25. A server, the server comprising:

processing circuitry configured to obtain default annotation information of a plurality of sampled users;

obtain an initial user score and an $i^{th}$ relative user score for each of the sampled users, the initial user score of the respective sampled user being determined as the initial relative user score of the respective sampled user when the initial user score of the respective sampled user cannot be calculate;

train a user score model in an initial iteration of i iterations according to the initial user score, the initial relative user score, and the default annotation information for each of the sampled users, i being equal to 1 for the initial iteration, the user score model being configured to output a second user score for each of the sampled users based on the initial user score, the initial relative user score, and the default annotation information of the respective sampled user, the second user score being used to train the user score model in a second iteration, i being equal to 2 for the second iteration;

for each of the i iterations after the initial training, train the user score model according to $i^{th}$ user scores of the sampled users for the respective iteration and $i^{th}$ relative user scores of the sampled users in the respective iteration, the user score model being configured to output an $(i+1)^{th}$ user score for each of the sampled users based on the $i^{th}$ user score of the respective sampled user and the $i^{th}$ relative user score of the respective sampled user;

determine whether training of the user score model is completed based on whether the $(i+1)^{th}$ user scores of the sampled users satisfy a training termination condition; and obtain a trained user score model when the $(i+1)^{th}$ user score of each of the sampled users satisfies the training termination condition, the $i^{th}$ relative user score of one of the sampled users being calculated according to an $i^{th}$ user score of each of one or more other users that has a social relation with the one of the sampled users; and the default annotation information of the one of the sampled users being used to classify the one of the sampled user.

26. The server according to claim 25, wherein when i=1, the processing circuitry is configured to for each of the sampled users determine, when a first user credit score of the respective sampled user cannot be calculated according to personal information of the respective sampled user, a first relative user credit score of the respective sampled user as the first user credit score of the respective sampled user, the first relative user credit score being calculated according to a first user credit score of each of the one or more other users that has the social relation with the respective sampled user.

27. The server according to claim 25, wherein the processing circuitry is configured to calculate a correlation coefficient between the $(i+1)^{th}$ user score for each of the sampled users and the $i^{th}$ user score for each of the sampled users;

detect whether the correlation coefficient is greater than a first threshold; and obtain the trained user score model for the respective sampled user based on a determination that the correlation coefficient is greater than the first threshold.

28. The server according to claim 25, wherein the processing circuitry is configured to obtain a social relation chain for each of the sampled users, the social relation chain being a social relation between the respective sampled user and the one or more other users that has the social relation with the respective sampled user;

obtain, according to the social relation chain, the $i^{th}$ user score for each of the one or more other users related to each of the sampled users; and calculate the $i^{th}$ relative user score for each of the sampled users according to the obtained $i^{th}$ score for each of the one or more other users.

29. The server according to claim 28, wherein the processing circuitry is configured to for each of the sampled users, calculate an average value of the $i^{th}$ user scores of the one or more other users related to the respective sampled user; and determine the average value as the $i^{th}$ relative user score of the respective sampled user.

30. The server according to claim 28, wherein the processing circuitry is configured to
for each of the sampled users,
obtain, according to the social relation chain, a corresponding weight related to each of the one or more other users; and
calculate the $i^{th}$ relative user score of the respective sampled user according to the $i^{th}$ score for each of the one or more other users that has the social relation with the respective sampled user and the corresponding weight related to each of the one or more other users, the calculating being operated through a following specific formula $$\text{score\_fri\_avg} = \sum_{j=1}^{n} \text{friend\_score\_j} * \text{op\_j} / \sum_{j=1}^{n} \text{op\_j},$$

score_fri_avg being the $i^{th}$ relative user score of one of the sampled users, friend_score_j being an $i^{th}$ score for a $j^{th}$ user of the one or more other users that has the social relation with the one of the sampled users, and op_j being a corresponding weight related to the $j^{th}$ user of the one or more other users that has the social relation with the one of the sampled users.

31. The server according to claim 25, wherein the processing circuitry is configured to
set i=i+1 when the $(i+1)^{th}$ user score for each of the sampled users does not satisfy the training termination condition, and perform another iteration of the training after the initial iteration to obtain a new $(i+1)^{th}$ user score for each of the sampled users.

32. The server according to claim 25, wherein the user score model includes a logistic regression classification model or a decision tree classification model.

33. The server according to claim 25, wherein the processing circuitry is configured to
obtain a first user score of a user and a first relative user score of the user, the first relative user score of the user being calculated according to a first user score of each of one or more other users that has a social relation with the user; and
input the first user score of the user and the first relative user score of the user to the trained user score model, to calculate a target user score of the user.

34. The server according to claim 33, wherein the processing circuitry is configured to
input the first user score of the user and the first relative user score of the user to the trained user score model, to calculate an $x^{th}$ user score of the user; and
determine the $x^{th}$ user score of the user as the target user score of the user when the $x^{th}$ user score of the user satisfies a preset condition.

35. The server according to claim 34, wherein the processing circuitry is configured to
calculate a difference between the $x^{th}$ user score of the user and an $(x-1)^{th}$ user score of the user;
detect whether the difference is less than a second threshold; and
determine the $x^{th}$ user score of the user as the target user score of the user based on a determination that the difference is less than the second threshold.

36. The server according to claim 34, wherein the processing circuitry is configured to
input the $x^{th}$ user score of the user and an $x^{th}$ relative user score of the user to the user score model again when the $x^{th}$ user score of the user does not satisfy the preset condition, to calculate an $(x+1)^{th}$ user score of the user; and
set x=x+1, and perform the determination again to calculate a difference between the $x^{th}$ user score of the user and an $(x-1)^{th}$ user score of the user.

* * * * *